(12) United States Patent
Abadir et al.

(10) Patent No.: US 9,141,945 B2
(45) Date of Patent: Sep. 22, 2015

(54) SECURE DISTRIBUTED SINGLE ACTION PAYMENT SYSTEM

(75) Inventors: Essam Ernest Abadir, Lancaster, PA (US); Rosco Schock, Lancaster, PA (US); Ian Dane Maffett, Lancaster, PA (US)

(73) Assignee: appMobi IPLC, Inc., Lancaster, PA (US)

( * ) Notice: Subject to any disclaimer, the term of this patent is extended or adjusted under 35 U.S.C. 154(b) by 6 days.

(21) Appl. No.: 13/024,789

(22) Filed: Feb. 10, 2011

(65) Prior Publication Data

US 2012/0143767 A1 Jun. 7, 2012

Related U.S. Application Data

(60) Provisional application No. 61/418,962, filed on Dec. 2, 2010.

(51) Int. Cl.

| G06Q 20/00 | (2012.01) |
| G06Q 20/10 | (2012.01) |
| G06Q 20/08 | (2012.01) |
| G06Q 20/38 | (2012.01) |
| G06Q 20/40 | (2012.01) |
| G06Q 30/06 | (2012.01) |
| H04L 9/32 | (2006.01) |
| H04W 12/06 | (2009.01) |

(52) U.S. Cl.
CPC .............. *G06Q 20/10* (2013.01); *G06Q 20/085* (2013.01); *G06Q 20/382* (2013.01); *G06Q 20/401* (2013.01); *G06Q 30/0601* (2013.01); *G06Q 30/0613* (2013.01); *H04L 9/321* (2013.01); *H04L 9/3234* (2013.01); *H04L 2209/56* (2013.01); *H04L 2209/80* (2013.01); *H04W 12/06* (2013.01)

(58) Field of Classification Search
USPC ............ 705/64, 16, 21, 71; 380/44, 262, 278, 380/279
See application file for complete search history.

(56) References Cited

U.S. PATENT DOCUMENTS

| 8,438,063 | B2 | 5/2013 | Albisu | |
| 2001/0008535 | A1* | 7/2001 | Lanigan | ........................ 370/487 |
| 2003/0233321 | A1 | 12/2003 | Scolini et al. | |
| 2006/0224470 | A1 | 10/2006 | Garcia Ruano et al. | |
| 2007/0297610 | A1* | 12/2007 | Chen et al. | .................... 380/270 |
| 2008/0082990 | A1* | 4/2008 | Kong et al. | ................... 719/318 |
| 2008/0262964 | A1 | 10/2008 | Bezos et al. | |
| 2012/0323781 | A1 | 12/2012 | Hayaashi et al. | |

* cited by examiner

*Primary Examiner* — Dante Ravetti
(74) *Attorney, Agent, or Firm* — Merchant & Gould, P.C.

(57) ABSTRACT

Methods and systems for enabling and performing secured, single action payments from a mobile device are disclosed. One method includes receiving user credentials at an application installed on a mobile device, and transmitting the user credentials from the mobile device to a server alongside a device identifier. The method includes receiving data at least partially defining encrypted personal payment information and saving the encrypted personal payment information in a memory of the mobile device in association with the application. At least prior to receiving a user request to make a payment via the application, the mobile device lacks a decryption key capable of decrypting the encrypted personal payment information.

7 Claims, 7 Drawing Sheets

SECURE DISTRIBUTED SINGLE ACTION PAYMENT SYSTEM

CROSS-REFERENCE TO RELATED APPLICATIONS

The present application claims priority to U.S. Provisional Patent Application No. 61/418,962, filed Dec. 2, 2010, the disclosure of which is hereby incorporated by reference in its entirety.

TECHNICAL FIELD

The present application relates generally to electronic payment systems. In particular, the present application relates to a secure distributed single action payment system.

BACKGROUND

Increasingly, individuals wish to make payments for goods and services by using mobile devices. When doing so, these individuals can make payments by submitting credit card and personal information, and confirming payment of a particular amount. When an individual initiates payment, that individual typically must enter information identifying that individual, as well as a method of payment. This entry process can be time consuming and frustrating for the individual if required to be performed each time an individual wishes to purchase a good or service.

Some existing payment systems attempt to simplify this payment process for the user by storing a user's personal payment information at a central server location from which all items are purchased. This arrangement has the advantage that the user does not need to reenter his/her payment information for each purchase. However, these systems may not be attractive to some potential users due to concerns regarding potential security shortcomings. For example, a user may wish to not have a third party store his/her payment information, which may lead to data breaches, unauthorized charges, or other unintended consequences.

For these and other reasons, improvements are desirable.

SUMMARY

In accordance with the following disclosure, the above and other issues are addressed by the following:

In a first aspect, a method of enabling a single action payment for an item at a mobile device is disclosed. The method includes receiving user credentials at an application installed on a mobile device, and transmitting the user credentials from the mobile device to a server alongside a device identifier. The method further includes receiving data at least partially defining encrypted personal payment information and saving the encrypted personal payment information in a memory of the mobile device in association with the application. At least prior to receiving a user request to make a payment via the application, the mobile device lacks a decryption key capable of decrypting the encrypted personal payment information.

In a second aspect, a method of enabling a single action payment for an item at a server communicatively connected to a mobile device is disclosed. The method includes receiving at the server a set of user credentials and a device identifier associated with the mobile device from an application on the mobile device, and transmitting data from a server at least partially defining encrypted personal payment information. The method further includes cooperating with the mobile device to decrypt the encrypted personal payment information, wherein the decrypted personal payment information is useable to initiate a payment transaction.

In a third aspect, a method of paying for an item is disclosed. The method includes receiving user credentials at an application installed on a mobile device, and transmitting the user credentials from the mobile device to a server. The method further includes receiving data from a server at least partially defining encrypted personal payment information, and receiving a request to make payment for an item. The method also includes transmitting encrypted personal payment information to the server, decrypting the personal payment information at the server, and transmitting the personal payment information from the server to a payment authority, thereby initiating a payment transaction.

In a fourth aspect, a secure distributed single-action payment system is disclosed. The system includes a mobile device comprising a programmable circuit and a memory, the memory configured to store an application within which payments can be requested. The programmable circuit is configured to execute program instructions which, when executed, cause the mobile device to receive user credentials at an application installed in the memory of the mobile device, transmit the user credentials from the mobile device to a server alongside a device identifier, and save encrypted personal payment information in the memory in association with the application. The system further includes a server communicatively connected to the mobile device, the server configured to execute program instructions which, when executed, cause the server to transmit data at least partially defining the encrypted personal payment information. At least prior to receiving a user request to make a payment via the application, the mobile device lacks a decryption key capable of decrypting the encrypted personal payment information.

Further, modifications and variations of the invention may be apparent to those skilled in the art upon reading this specification, and can be made without departing from its spirit and scope. The invention is therefore to be limited only by the terms of the appended claims, along with the full scope of equivalents to which the claims are entitled.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
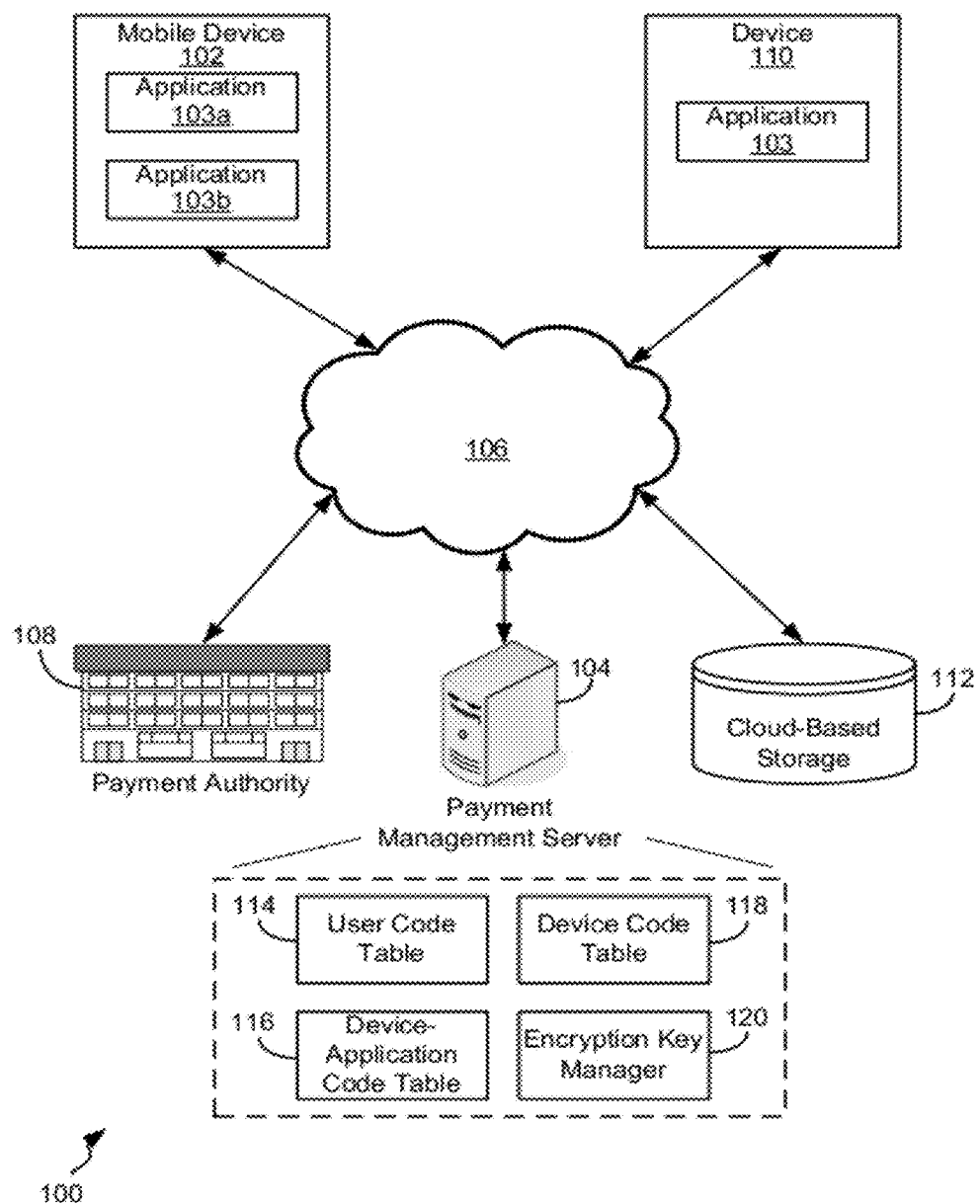
FIG. 1 is a schematic diagram of an example network in which aspects of the present disclosure can be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to systems and methods that allow individuals (e.g., users) to pay for goods and services by using a device, such as a mobile device, smart phone, tablet, or computer, in such a way that no centralized list of credit card numbers belonging to one or more users is ever created on a single server, while concurrently avoiding user-reentry of payment information for each desired purchase. In some aspects, a user's personal payment information is stored on that user's computing device in encrypted form in any application made using the program interfaces of the code of the system disclosed herein. When a purchase is requested (for example, due to a single action by that user), the encrypted personal payment information can be accessed and submitted to a payment authority to initiate the purchase transaction.

As used herein, the term "Personal Payment Information" or "PPI", as used herein, means the mechanism or information used by a user to pay for goods or services online. In various embodiments described herein, Personal Payment Information can include a credit card number or alternatively some other form of "funding account" such as information for a checking account or credentials for any account (like a PayPal account) which fund the transaction.

As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Additionally, the meaning of "a," "an," and "the" include plural references, and the meaning of "in" includes "in" and "on."

Referring now to FIG. 1, a schematic diagram of an example network 100 is shown in which aspects of the present disclosure can be implemented. The network 100 includes various entities involved in an individual user's purchase of an item, whether a good or service provided to the user.

In the embodiment shown, the network 100 includes a mobile device 102 communicatively connected to a payment management server 104 via a network, shown as the Internet 106. The mobile device 102 can include one or more applications 103a-b stored thereon (referred to collectively as applications 103). Within each application, a user can select a payment option for an item, such as good or services presented within that application (or external to the application). The application 103 may be any program written to run on the device 102 so long as the application 103 uses the program interfaces of the code of the system of the present disclosure. This code may be incorporated in a program using techniques well known in the art such as though an application programming interface ("API") or software development kit ("SDK").

In certain embodiments, one or more of the applications 103 can include therein encrypted PPI, useable to initiate a secure, one-tap or one-click payment operation from the mobile device. Use of such information is discussed further below in connection with the flowcharts of FIGS. 4-6.

The payment management server 104 can take any of a number of forms, and typically includes one or more computing devices, such as that illustrated in connection with FIG. 7, below. Generally, the payment management server 104 maintains a listing of known users and known devices, and manages encryption and decryption keys used to access PPI. The payment management server 104 determines whether known users should be allowed access to decrypted PPI through use and release of decryption keys. For example, an application 103 on the mobile device 102 containing encrypted PPI may request to initiate payment, and, if the payment management server 104 determines that the user of that application is an authorized user, the payment management server 104 could either decrypt received encrypted PPI, or could transmit a decryption key to the mobile device 102 for use in decrypting the encrypted PPI.

In the various embodiments of the present disclosure, the payment management server 104 can utilize a wide range of types of encryption keys, such as a public/private key pair or symmetric keys generated using various encryption algorithms. The details of encryption key security are well known in the art.

Additionally, when communicating with the payment management server 104, in some embodiments, every individual user has a unique username and password specific to the system of the present disclosure. In such embodiments, multiple applications using the API's of the system of the present disclosure would prompt the user to use the same username for purposes of making and managing payments, regardless of whether the applications were on one or more devices. An individual's username need not be the same as is used within each of the programs for purposes other than payments within the context of the present disclosure.

In some embodiments, the payment management server 104 could be located in a Cloud. "Cloud" as used in the present disclosure refers to a set of virtualized computing resources whereby shared resources, software, and information are provided to computers and other devices on demand. In the Cloud, the resources that might normally be associated with one server could still represent themselves in the same manner although in actuality the resources are served by fractional resources on a single server or even by multiple servers in collaboration.

In embodiments where a Cloud is used, the user could also have a personal storage locker at a storage area, separate from the payment management server 104, which represents a location at which that user's information (including PPI) can be stored. The Cloud could be operated, for example, by the entity that created application 103. Alternatively, the Cloud could be operated by a separate party such as, for instance, a cloud provider like Amazon AWS, a carrier network, or a licensee of the payment system. Further details regarding the personal storage locker are provided in connection with FIG. 3, below.

A payment authority 108 is communicatively interconnected to the network 106, and is generally configured to receive payment information from users or other entities defining transactions which have taken place. In various embodiments described herein, the payment authority 108 can be a credit card payment processor, such as a bank or other financial institution. In other embodiments, the payment authority 108 can be another type of payment account administrator, for example Paypal or a checking account manager.

A second device 110 is also connected to the network 106, and can be any of a number of types of computing devices, such as that illustrated in connection with FIG. 7, below. In operation, the mobile device 102 and second device 110 both communicate with server 104 to facilitate payment for items by a user. As such, the second device 110 also has an application 103 stored thereon, which is useable to initiate payment for an item, analogously to the applications 103 stored on the mobile device 102.

Mobile device 102 and second device 110 may also communicate with a storage area 112, which may be the location of personal storage locker, described in further detail in connection with FIG. 3, below. The storage area 112 can include separate personal storage lockers, each of which stores a user's personal payment information and other personal information, and preferably remains under access control of the user (and not the entity controlling the payment management server 104). In various embodiments, the storage area 112 acts as a secure second computing device at which specific user information, including PPI, can be stored.

Referring again to the payment management server 104, this server generally tracks authorized users and holders of encrypted PPI, as well as manages distribution of encryption keys and decryption keys used for securing the PPI. As such, the payment management server 104, in the example shown, includes a user code table 114, a device code table 116, an optional device-application pair code table 118, and an encryption key manager 120. The user code table 114 stores a listing of unique user identities, for example based on a user's login credentials.

The device code table 116 stores unique device codes for each device, and the device-application pair code table 118 optionally stores unique codes for each device-application pair, useable to distinguish at the payment management server 104 among multiple applications on a same device. Use of the device codes and device-application pair codes are discussed further below.

The encryption key manager 120 generates encryption key pairs useable to encrypt a user's PPI, and to transmit encryption and decryption keys depending upon the specific user and type of key needed, using the methods and systems described herein. Additional details regarding use of encryption keys are discussed below in connection with FIGS. 4-6.

Figure 2A:
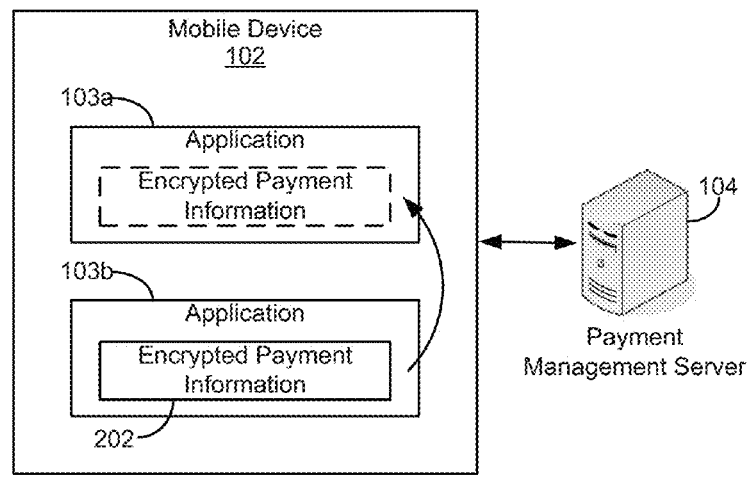
FIG. 2A is a schematic diagram of shared payment information between applications implemented according to a possible embodiment of the present disclosure.
Figure 2B:
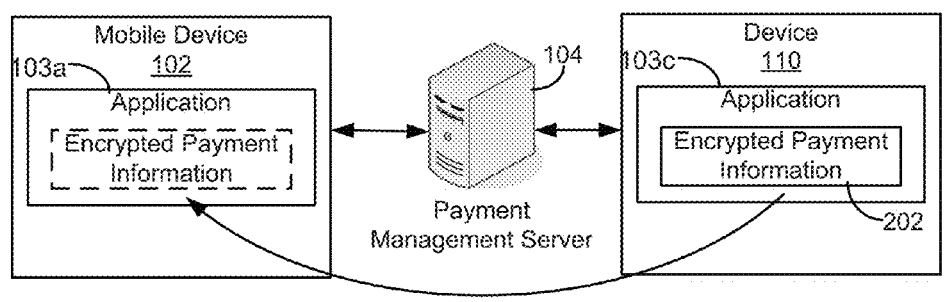
FIG. 2B is a schematic diagram of shared payment information between applications on different devices, implemented according to a possible embodiment of the present disclosure.

Referring now to FIGS. 2A-2B, schematic diagrams illustrating shared payment information are illustrated. FIG. 2A is a schematic diagram of shared payment information between applications of a single device, while FIG. 2B illustrates shared payment information between applications on different devices. Through sharing of encrypted payment information between devices, the overall payment systems of the present disclosure can avoid storage of PPI at a single location, which mitigates security concerns.

Referring now specifically to FIG. 2A, a first example shared payment information arrangement 200 is shown. In this arrangement, the mobile device 102 is interconnected to the payment management server 104. The mobile device includes two applications 103*a*, 103*b*, of which only one has encrypted PPI 202 (shown in this embodiment as application 103*b*). When a user wishes to make payment from within application 103*a*, a request for authorization is sent to the payment management server 104, including the user's credentials and an identifier of the mobile device 102. Because application 103*a* lacks the encrypted PPI 202 (e.g., because this is the first time that the application 103*a* has been used by that particular user, and therefore the user has not yet entered his/her preferred PPI), the payment management server 104 recognizes the user as authorized and the mobile device 102 as including another application having previously been authorized (i.e., application 103*b*), and therefore indicates to the mobile device 102 to obtain the encrypted PPI 202 from application 103*b* for use in application 103*a*. Upon receiving a subsequent request to initiate payment from the user, the application 103*a* will have the encrypted PPI 202 stored within it, or share it from a common location with application 103*b*, and therefore can directly cooperate with the payment management server 104 to decrypt the encrypted PPI 202 and forward it to the relevant payment authority 108 defined in the now-decrypted PPI. In an alternative embodiment, application 103*a* may receive the PPI from application 103*b* in unencrypted form and use the PPI for a single transaction without further storing it.

In FIG. 2B, a second example shared payment information arrangement 250 is shown in which the mobile device 102 includes only a single application 103*a*. In this arrangement, when a user wishes to make payment from within application 103*a*, a request for authorization is sent to the payment management server 104, including the user's credentials and an identifier of the mobile device 102. Because application 103*a* lacks the encrypted PPI 202 (e.g., because this is the first time that the application 103*a* has been used by that particular user, and therefore the user has not yet entered his/her preferred PPI into that application 103*a*), the payment management server 104 recognizes the user as authorized, but in this case does not recognize the identifier of the mobile device 102. So, the payment management server 104 will retrieve an identifier of another device (e.g., second device 110) already known to the server as associated with the identified user and connect to that known device. The payment management server 104 will then obtain encrypted PPI 202 from an application 103*c* on that known device, forwarding the encrypted PPI 202 back to the application 103*a* on the mobile device 102 for subsequent use within application 103*a*.

Figure 3:
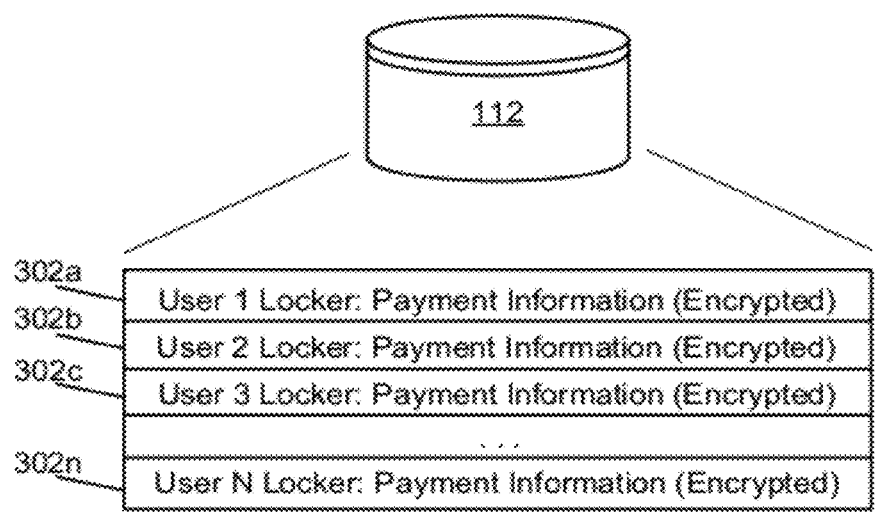
FIG. 3 is a schematic diagram illustrating remote storage of payment information, according to a possible embodiment of the present disclosure.

FIG. 3 is a schematic diagram illustrating a storage area 112 for payment information, according to a possible embodiment of the present disclosure. The storage area 112 can, in certain embodiments, include a plurality of personal storage lockers 302*a-n* capable of containing PPI (collectively or individually, a personal storage locker 302). Each personal storage locker 302 can be a storage area dedicated to an individual user. In certain embodiments, the personal storage locker 302 associated with a given user is accessible by that user and by the payment management server 104. In certain embodiments, the storage area 112 is a Cloud-based storage area located on one or more virtualized computing resources.

The means of communication between a user's device (e.g., mobile device 102 or second device 110) and a personal storage locker 302 associated with that user are well known in the art and may include, but are not limited to, a TCP connection, a UDP connection, email, or any other network communication means.

In use, a particular personal storage locker 302 can be directly accessed by the device to obtain the encrypted PPI 202 if so enabled by the application 103. In alternative embodiments, the personal storage locker 302 for a particular user can be assigned a device identifier and treated as a known device by the payment management server 104, analogously to the second device 110 of FIG. 2B. In either situation, the personal storage locker remains persistently available to the mobile device 102 or payment management server 104, which may not be the case if attempting to access encrypted PPI 202 from a different, remotely located device (e.g., second device 110).

Figure 4:
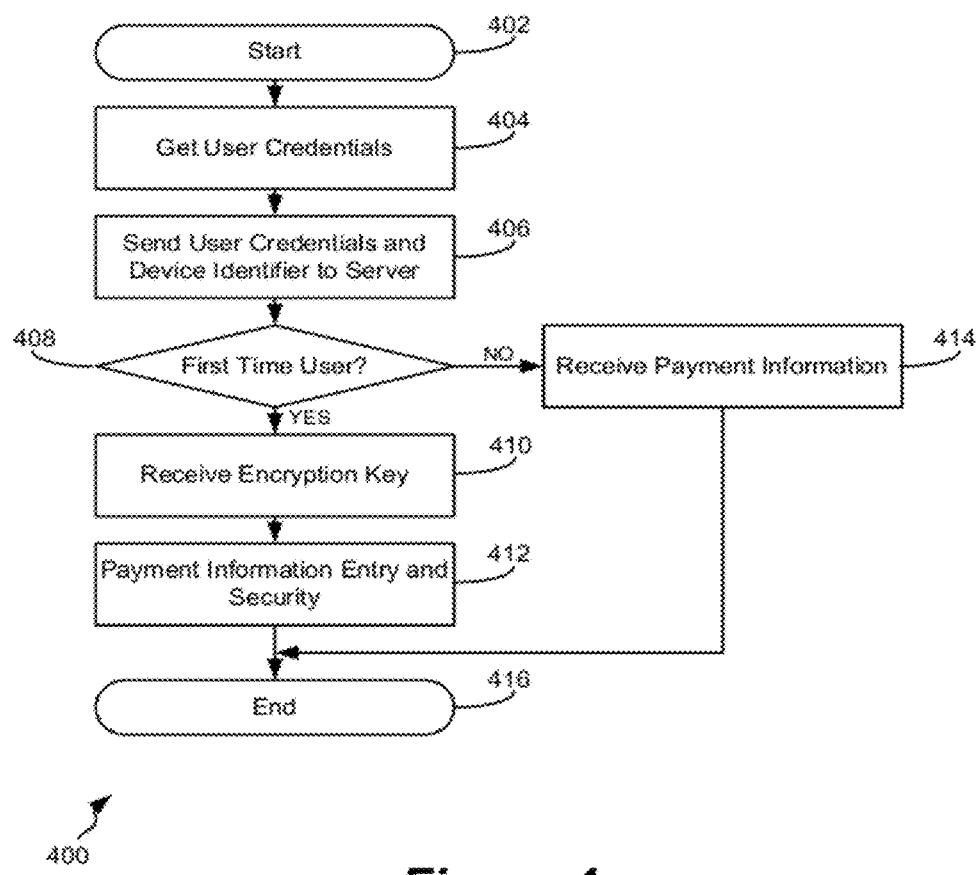
FIG. 4 is a flowchart of methods and systems for user authentication at a mobile device for use in connection with a single-action payment system, according to a possible embodiment of the present disclosure.
Figure 5:
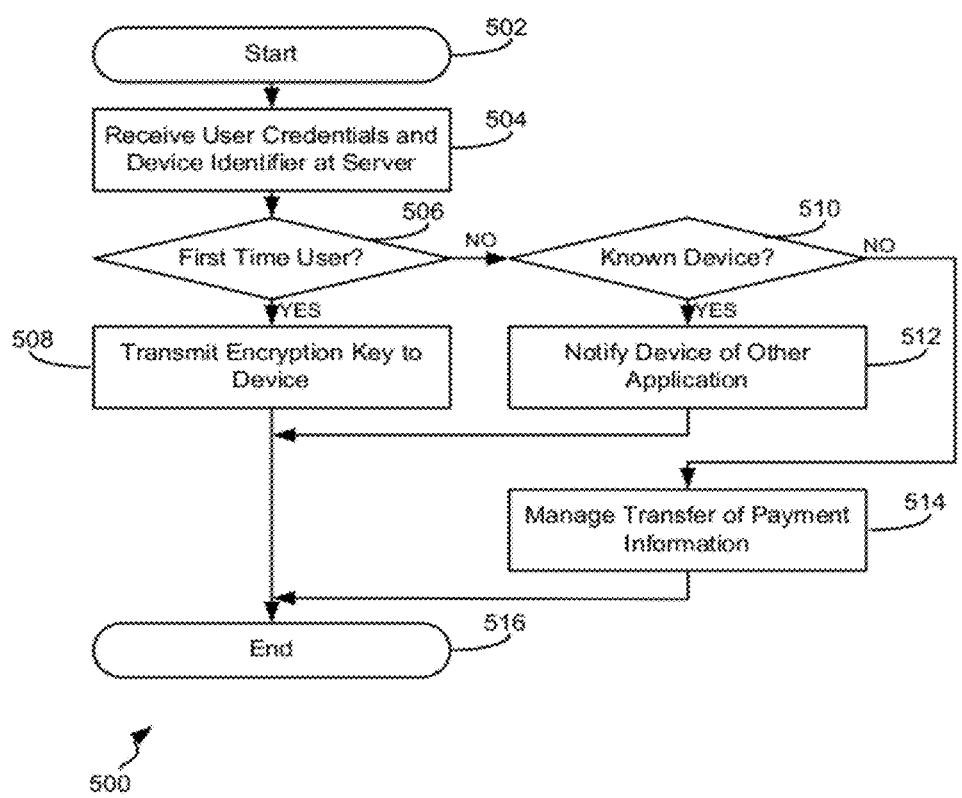
FIG. 5 is a flowchart of methods and systems for user authentication at a payment management server for use in connection with a single-action payment system, according to a possible embodiment of the present disclosure.
Figure 6:
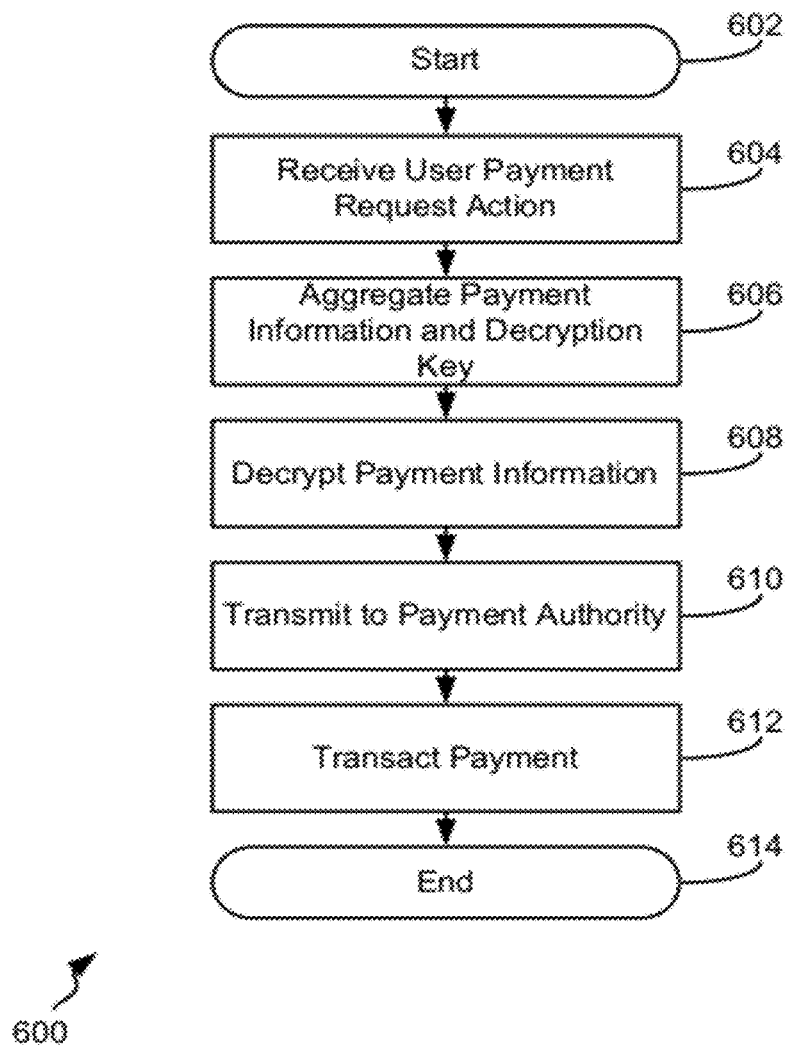
FIG. 6 is a flowchart of methods and systems for performing a user-initiated payment, according to a possible embodiment of the present disclosure.

Referring now to FIGS. 4-6, flowcharts of methods and systems for providing a secure, single-action payment system are provided, according to various possible embodiments of the present disclosure. FIGS. 4-5 illustrate details of operations performed by a device and server, respectively, for user and device authentication in connection with a single-action payment system, while FIG. 6 illustrates an example single-action payment method used at either a user device or at the server.

FIG. 4 is a flowchart of an example method 400 for user authentication at a mobile device for use in connection with a single-action payment system, according to a possible embodiment of the present disclosure. The method is instantiated at a start operation 402, which corresponds to initial installation of an application (e.g., application 103) on a user's computing device, for example a mobile device 102 of FIG. 1. When a user first signs in using application 103 on device 102, a unique code may be created that is specific to this device and application pair, and stored on the payment management server 104.

A user credentials receipt operation 404 receives user credentials (e.g., a user name and password or other identifying information) from a user at the mobile device 102. Every individual using the system as disclosed herein has a unique username-password combination within the system, which can be stored at one or both devices 102, 110 and the payment management server 104 as discussed in more detail below.

A data forwarding operation 406 sends several pieces of information to the payment management server 104, including the user credentials supplied in the user credentials receipt operation 404, as well as a code identifying the application 103, a code identifying the device 102, and optionally a unique code specific to the device-application pair, described above. Additional identifying information may be included as well. In certain embodiments, the user does not need to know the code for the application, for the device, or for the device-application code. An individual's username need not be the same as is used within each of the programs for purposes other than payments within the context of the present disclosure.

A first time user determination operation 408 occurs at a server, and depending on its outcome, the mobile device 102 may receive different types of information. If the user credentials identify a first time user, an encryption key receipt operation 410 receives an encryption key. A payment information operation 412 prompts the new user to enter that user's preferred PPI (e.g., credit card, PayPal, check, or other payment information), either by manual entry of information or through automated mechanisms such as optical character recognition of the numbers through use of a camera on the mobile device, and encrypts the user's entered PPI with the encryption key received from the payment management server 104, forming encrypted PPI (e.g., as illustrated as encrypted PPI 202 in FIGS. 2-3). The payment information operation 412 then stores the encrypted PPI 202

In one embodiment, the user's encrypted PPI is stored in encrypted form on device 102. In another embodiment, the user's PPI could be stored in encrypted form in the storage area 112, for example in a personal storage locker 302 associated with that user. In either embodiment, the user's PPI is not persistently stored on payment management server 104 and the encryption key is not persistently stored in the application 103 or the device 102. In addition, the user's PPI is not persistently stored throughout the system 100 in an unencrypted form.

If the user credentials are determined at the payment management server 104 to relate to a preexisting user, in a PPI receipt operation 414 that preexisting user receives PPI, either from another application on the same device 102 (e.g., as illustrated in FIG. 2A), another device (e.g., as illustrated in FIG. 2B), or from a personal storage locker 302 (e.g., as illustrated in FIG. 3). The determination of whether to acquire the PPI from the same device or a different device can be made at the server, and the device 102 is notified by the server of the location from which the encrypted PPI can be received. Details regarding this determination are described in further detail in connection with FIG. 5.

In certain embodiments of the present disclosure, the PPI receipt module 414 receives the personal payment information in encrypted form, thereby requiring that the mobile device 102 be granted access to a decryption key allowing that mobile device to access unencrypted personal payment information. In alternative embodiments, the PPI receipt module 414 receives unencrypted PPI, and therefore is not required to receive a decryption key to access and use the PPI. In such embodiments, the PPI receipt module 414 does not persistently store the PPI in an unencrypted form; rather, after use in payment (as discussed below in connection with FIG. 6) the PPI is either encrypted prior to storage or discarded altogether.

Following receipt of the PPI, and optionally storage of encrypted information to create encrypted PPI at the mobile device 102 and associated with the particular application 103 operated by a user, operational flow within the method 400 terminates at an end operation 416, signifying completed validation and acquisition of payment information, such that the mobile device is ready to perform a secured single-action payment operation.

FIG. 5 is a flowchart of an example method 500 for user authentication at a payment management server for use in connection with a single-action payment system, according to a possible embodiment of the present disclosure. The method 500 generally can be used in conjunction with the method 400 of FIG. 4, and occurs on a server, such as payment management server 104 of FIG. 1. A start operation 502 generally corresponds to initiation of a payment authorization process from a user of a device, such as mobile device 102 of FIG. 1. A data receipt operation 502 generally corresponds to receipt of data from a mobile device, including the user credentials supplied in the user credentials receipt operation 404 of FIG. 4, as well as a code identifying the application 103, a code identifying the device 102, and optionally a unique code specific to the device-application pair.

A first time user determination operation 506 determines whether the user credentials identify a first time user of the secured payment system of the present disclosure. This can occur, for example, by comparing the unique user credentials received from the mobile device to a database of user credentials managed at the payment management server 104. If the user is a first time user, an encryption key transmission operation 508 transmits an encryption key to the mobile device and application from which the data was received, for encrypting user-entered PPI. If the user is not a first time user, a known device operation 510 determines whether the device is a known device, for example by comparing the unique device code received from the mobile device to a database of codes managed at the payment management server 104. Optionally, the known device operation 510 also compares the device-application pair code to other codes, to determine whether the device may be known, but the application is different from the application known at the payment management server 104.

If the device is known, a PPI reference operation 512 causes the payment management server 104 to send a message to the mobile device 102 to obtain the PPI from another application on the mobile device or from a known pre-determined location on the device. The PPI reference operation 512 then optionally also stores a new device-application pair code at the payment management server 104, to track that the requesting application and device are now known.

If the device is not known, a PPI transfer operation 514 causes the payment management server 104 to manage transfer of PPI from another device (e.g., second device 110 of FIGS. 1 and 2B) or the user's personal storage locker 302 to the device. Communication between the applications 103 on the different devices (e.g., device 102 and 110, respectively) can take several forms that are well known in the art. For instance, the server 104 can act as a passthrough conduit, or it could inform one device about the other and the devices could communicate between themselves. Other methods are possible as well.

In such embodiments in which transfer of PPI is performed, the payment management server 104 can locate a known device or personal storage locker associated with the user (based on the entered user credentials) and can manage transfer of the PPI. Additionally, the payment management server 104 can update its records, adding the device code and optional device-application code, thereby indicating that the device and application are now known to the payment management server 104.

As mentioned above, the PPI transfer operation 514 can, in certain embodiments, transfer encrypted PPI to the device 102 for use within the application 103. In other embodiments, the PPI transfer operation 514 facilitates transfer of unencrypted PPI to the device 102 for use; in such embodiments, the unencrypted PPI is either encrypted and stored or discarded entirely after use to prevent storage of unencrypted PPI at the device 102.

An end operation 516 corresponds to completed validation of the user and device at a server, such that the server is ready to assist in performing a secured single-action payment operation.

FIG. 6 is a flowchart of an example method 600 for performing a user-initiated payment, according to a possible embodiment of the present disclosure. The method 600 can, in various embodiments, correspond to actions taken at least in part by a user device, a server, or both devices in combination. A start operation 602 generally corresponds to initiation of a payment operation from a user of a device, such as mobile device 102 of FIG. 1. A user payment request receipt operation 604 corresponds to receipt of a user payment request action, either at the mobile device or when subsequently forwarded to a server device, such as payment management server 104. To trigger the user payment request receipt operation 604, a user can take a single action, such as a single click or a single tap of a touch sensitive screen on device 102, to make the purchase. Application 103 may optionally require a verification step, for example via password, before transmitting or accepting the user's purchase request. In such an embodiment, it is assumed that the user has previously identified a favored payment method which is used as a default in the future, and is included in that user's PPI, provided to the mobile device 102 according to the methods of FIGS. 4-5. In alternative embodiments, at the time the purchase button is displayed the user may optionally be presented with a choice of payment methods, each of which is included in that user's PPI. The presentation of that choice may take many forms including, but not limited to, drop down lists, radio buttons, or confirmation pop-ups.

In certain embodiments, an aggregation operation 606 collects the user's PPI, in encrypted form, and a decryption key at a common location, such that the decryption key can be used to decrypt the encrypted PPI in a decryption operation 608. In one possible embodiment, the aggregation operation 606 causes the decryption key to be transmitted from the server to the device operated by the user, and the decryption operation occurs on a device (e.g., mobile device 102). In an alternative embodiment, the aggregation operation 606 causes the encrypted PPI to be transmitted from the device to the server, and the server performs the decryption operation using a decryption key stored at the server.

It is noted that during the aggregation operation 606, as well as during other messaging transactions occurring in the systems of the present disclosure, information is encrypted during transit, thereby protecting the PPI and other identifying information. In some embodiments in which encrypted PPI is transmitted between devices, the information would be double encrypted since the connection between device and server uses an encrypted channel such as SSL.

In alternative embodiments, an operation such as aggregation operation 606 may be unnecessary, for example in circumstances where a mobile device is provided with unencrypted PPI from another application or device (e.g., the encrypted PPI managed by that other application or device is decrypted separately from the application requesting use of the PPI). In such circumstances, the PPI is not stored at the requesting application to ensure that security for the PPI is maintained. If necessary (e.g., if the PPI is received from a separate device), the PPI is also encrypted during transit using standard secure transmission protocols.

A transmission operation 610 transmits the decrypted PPI from the device at which the decrypted PPI resides (e.g., the receiving or decrypting mobile device 102 or the decrypting server 104) to a payment authority (e.g., payment authority 108 of FIG. 1) via a secure connection for use in payment for an item. Various types of secure connections and payment authorities could be used in the different embodiments of the present disclosure; the specifics of this process are well known in the art. The device forwarding the decrypted PPI to the payment authority also discards the particular information not stored at that device. For example, if the mobile device 102 performs the decryption operation 608, it will then discard the decrypted PPI and the decryption key after transmitting the decrypted PPI to the payment authority (while optionally also retaining the encrypted PPI). In the alternative example where the server performs the decryption operation, the server will discard the decrypted PPI and the encrypted PPI, but will maintain storage of the decryption key for subsequent uses. Therefore, there is no central repository of PPI for one or more users persisted on the server 104, and no device contains both a decryption key and encrypted PPI.

In a payment transaction operation 612, the payment is finalized. This can include, for example approval or remittance of payment to a vendor as selected by the user of the device 102. An end operation 614 corresponds to completed single action payment.

It is noted that, for subsequent iterations of method 600 after a device has been authenticated and provided encrypted PPI using the systems and methods of FIGS. 4-5, the user need not reenter the PPI onto the device, since that information is either retained or returned to the device from another device (e.g., device 110 or personal storage locker 302), as managed by the server 104.

Figure 7:
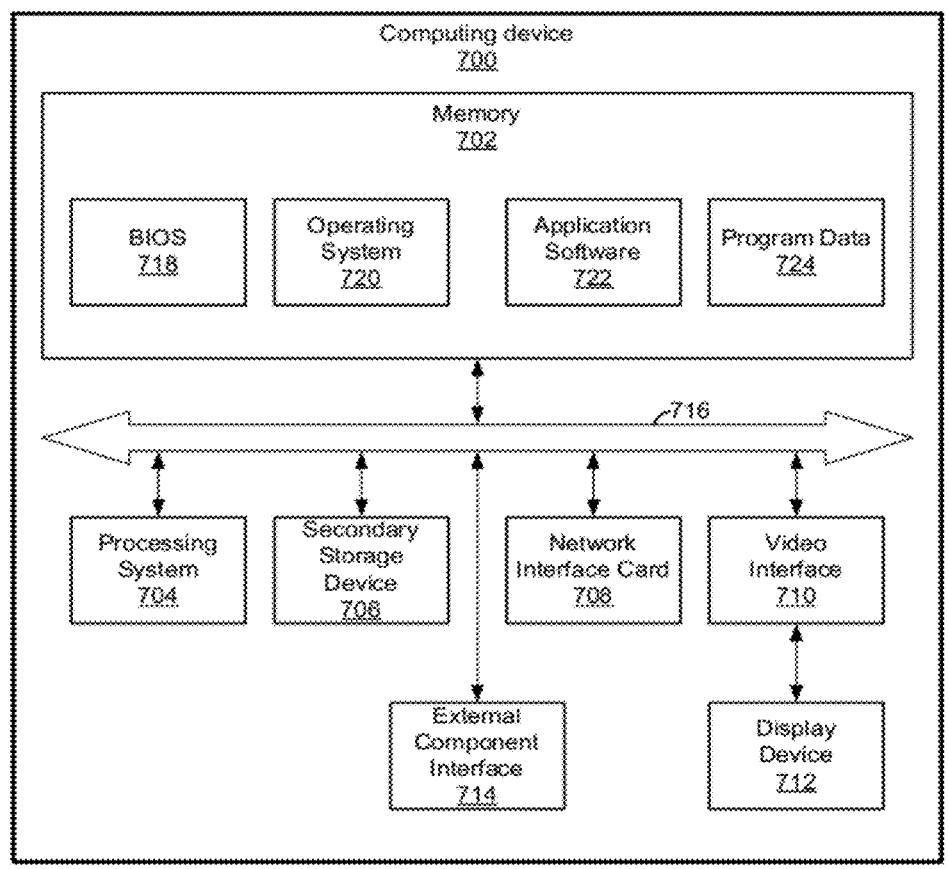
FIG. 7 is a block diagram illustrating example physical details of an electronic computing device, with which aspects of the present disclosure can be implemented.

FIG. 7 is a block diagram illustrating an example computing device 700. In some embodiments, the mobile device 102, server 104, second device 110, and one or more cloud-based devices providing remote storage 112 of FIGS. 1-3 are implemented as one or more computing devices like the computing device 700. It should be appreciated that in other embodiments, the mobile device 102, server 104, or other devices described above are implemented using computing devices having hardware components other than those illustrated in the example of FIG. 7.

The term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. As used herein, the term "modulated data signal" refers to a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In the example of FIG. 7, the computing device 700 includes a memory 702, a processing system 704, a secondary storage device 706, a network interface card 708, a video interface 710, a display unit 712, an external component interface 714, and a communication medium 716. The memory 702 includes one or more computer storage media capable of storing data and/or instructions. In different embodiments, the memory 702 is implemented in different ways. For example, the memory 702 can be implemented using various types of computer storage media.

The processing system 704 includes one or more processing units. A processing unit is a physical device or article of manufacture comprising one or more integrated circuits that selectively execute software instructions. In various embodiments, the processing system 704 is implemented in various ways. For example, the processing system 704 can be implemented as one or more processing cores. In another example, the processing system 704 can include one or more separate microprocessors. In yet another example embodiment, the processing system 704 can include an application-specific integrated circuit (ASIC) that provides specific functionality. In yet another example, the processing system 704 provides specific functionality by using an ASIC and by executing computer-executable instructions.

The secondary storage device 706 includes one or more computer storage media. The secondary storage device 706 stores data and software instructions not directly accessible by the processing system 704. In other words, the processing system 704 performs an I/O operation to retrieve data and/or software instructions from the secondary storage device 706. In various embodiments, the secondary storage device 706 includes various types of computer storage media. For example, the secondary storage device 706 can include one or more magnetic disks, magnetic tape drives, optical discs, solid state memory devices, and/or other types of computer storage media.

The network interface card 708 enables the computing device 700 to send data to and receive data from a communication network. In different embodiments, the network interface card 708 is implemented in different ways. For example, the network interface card 708 can be implemented as an Ethernet interface, a token-ring network interface, a fiber optic network interface, a wireless network interface (e.g., WiFi, WiMax, etc.), or another type of network interface.

The video interface 710 enables the computing device 700 to output video information to the display unit 712. The display unit 712 can be various types of devices for displaying video information, such as a cathode-ray tube display, an LCD display panel, a plasma screen display panel, a touch-sensitive display panel, an LED screen, or a projector. The video interface 710 can communicate with the display unit 712 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 714 enables the computing device 700 to communicate with external devices. For example, the external component interface 714 can be a USB interface, a FireWire interface, a serial port interface, a parallel port interface, a PS/2 interface, and/or another type of interface that enables the computing device 700 to communicate with external devices. In various embodiments, the external component interface 714 enables the computing device 700 to communicate with various external components, such as external storage devices, input devices, speakers, modems, media player docks, other computing devices, scanners, digital cameras, and fingerprint readers.

The communications medium 716 facilitates communication among the hardware components of the computing device 700. In the example of FIG. 7, the communications medium 716 facilitates communication among the memory 702, the processing system 704, the secondary storage device 706, the network interface card 708, the video interface 710, and the external component interface 714. The communications medium 716 can be implemented in various ways. For example, the communications medium 716 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718 and an operating system 720. The BIOS 718 includes a set of computer-executable instructions that, when executed by the processing system 704, cause the computing device 700 to boot up. The operating system 720 includes a set of computer-executable instructions that, when executed by the processing system 704, cause the computing device 700 to provide an operating system that coordinates the activities and sharing of resources of the computing device 700. Furthermore, the memory 702 stores application software 722. The application software 722 includes computer-executable instructions, that when executed by the processing system 704, cause the computing device 700 to provide one or more applications. The memory 702 also stores program data 724. The program data 724 is data used by programs that execute on the computing device 700.

In various embodiments, the computing device 700 can take any of a number of forms. For example, the computing device 700 can be a mobile telecommunications device, a tablet computing device, a netbook or laptop computing device, or a desktop or server computing device. Various peripheral equipment or features can be incorporated into the computing device, as described above with respect to the external component interface 714.

Overall, a number of advantages of the methods and systems of the present disclosure exist. For example, in light of the frequency of security breaches, it is advantageous to consumers to avoid having their personal payment numbers permanently stored on a central server since that prevents multiple credit card numbers from being stolen from a single location. Furthermore, the system and methods of the present disclosure present even greater hurdles to would be thieves of PPI since not only must the thief gain access to the physical device of the user in order to steal PPI but he must also steal the decryption key in order to make any use of the encrypted PPI.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

All references cited and/or discussed in this specification are incorporated herein by reference in their entirety and to the same extent as if each reference was individually incorporated by reference.

The invention claimed is:

1. A method of enabling a single action payment for an item at a mobile device, the method comprising:
    associating, by the mobile device, a memory of the mobile device with an application installed on the mobile device;
    receiving, by the mobile device, user credentials at the application installed on the mobile device;
    obtaining, by the application, a device identifier associated with the mobile device;
transmitting, by the mobile device, the user credentials and the obtained device identifier from the application installed on the mobile device to a payment management server;
    receiving, from the payment management server, an encryption key;
    receiving, by the mobile device, data to be included in personal payment information;
    encrypting the data using the received encryption key;
    creating, by the mobile device, an encrypted personal payment information;
    saving, by the mobile device, the encrypted personal payment information in a memory of the mobile device associated with the application;
    discarding the received encryption key and any unencrypted data included in the personal payment information from the mobile device;
    determining, by the mobile device, that the encrypted personal payment information has been saved and that the encryption key has been discarded;
    based on a determination that the encrypted personal payment information has been saved and that the encryption key has been discarded, receiving, by the mobile device, a single action from a user;
    wherein the single action defines a user request to make a payment; and
    obtaining, at the mobile device, a decryption key used to decrypting the encrypted personal payment information.

2. The method of claim 1, wherein the personal payment information is received at the mobile device from a user.

3. The method of claim 2, further comprising capturing the personal payment information using a camera incorporated with the mobile device.

4. The method of claim 3, wherein capturing the personal payment information includes extracting characters from an image using optical character recognition.

5. The method of claim 1,
    determining, by the mobile device, that an action was received at the mobile device;
    based on a determination, by the mobile device, that an action was received at the mobile device:
    transmitting the encrypted personal payment information to the payment management server to transact the payment.

6. The method of claim 1, further comprising,
    determining, by the mobile device, that an action was received at the mobile device;
    based on a determination, by the mobile device, that an action was received at the mobile device:
    receiving at the mobile device a decryption key from the payment management server;
    decrypting the encrypted personal payment information at the mobile device; and
    transmitting the personal payment information from the mobile device to a payment authority, thereby initiating a payment transaction.

7. The method of claim 1, further comprising,
    determining, by the mobile device, that an action was received at the mobile device;
    based on a determination, by the mobile device, that an action was received at the mobile device:
    receiving at the mobile device a decryption key from the payment management server;
    decrypting the encrypted personal payment information at the mobile device; and providing the unencrypted personal payment information to the requesting application, thereby initiating a payment transaction.

* * * * *